E. J. SWEETLAND.
FILTER.
APPLICATION FILED MAY 18, 1916.
1,292,534.
Patented Jan. 28, 1919.
5 SHEETS—SHEET 3.
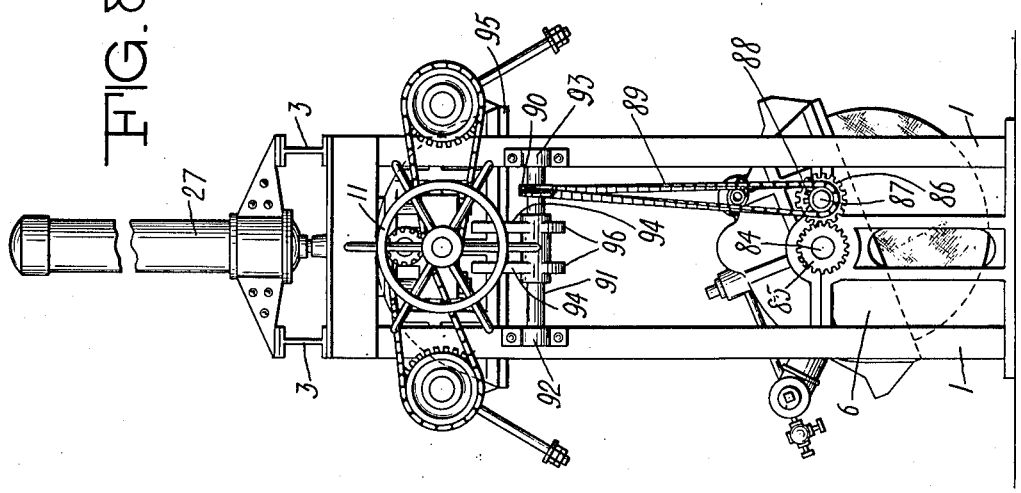
FIG. 8
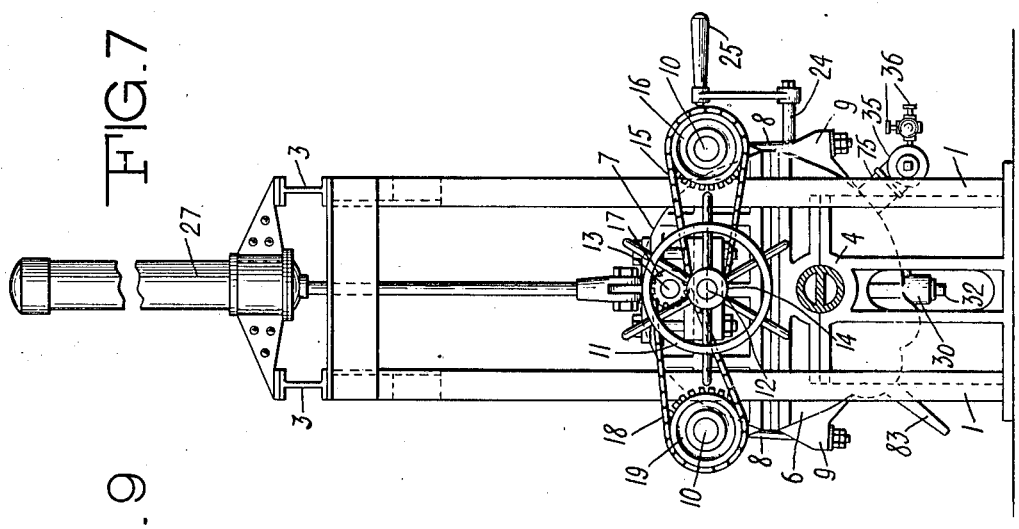
FIG. 7
FIG. 9
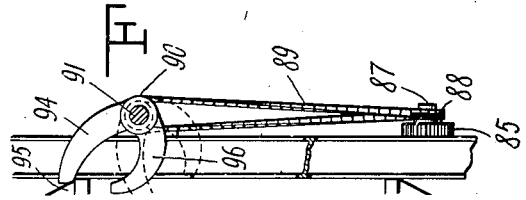
Ernest J. Sweetland INVENTOR.
BY
G. E. Terwilliger ATTORNEY

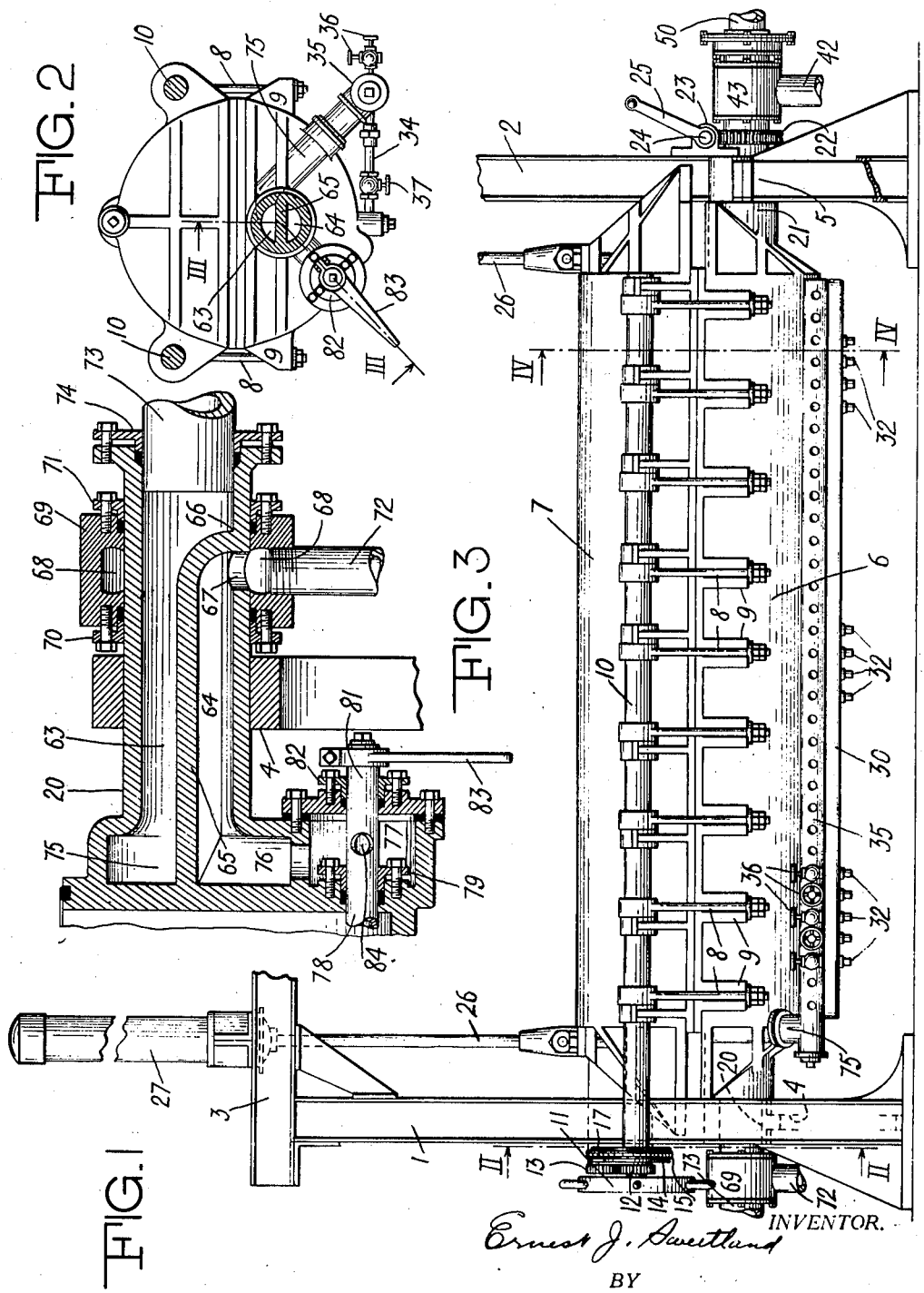

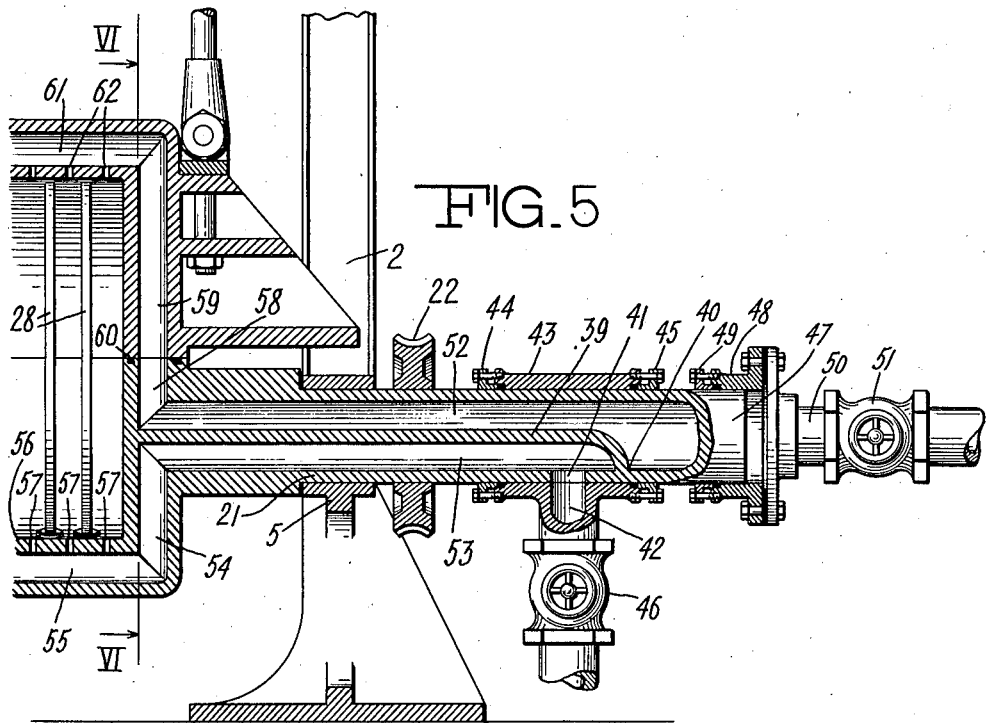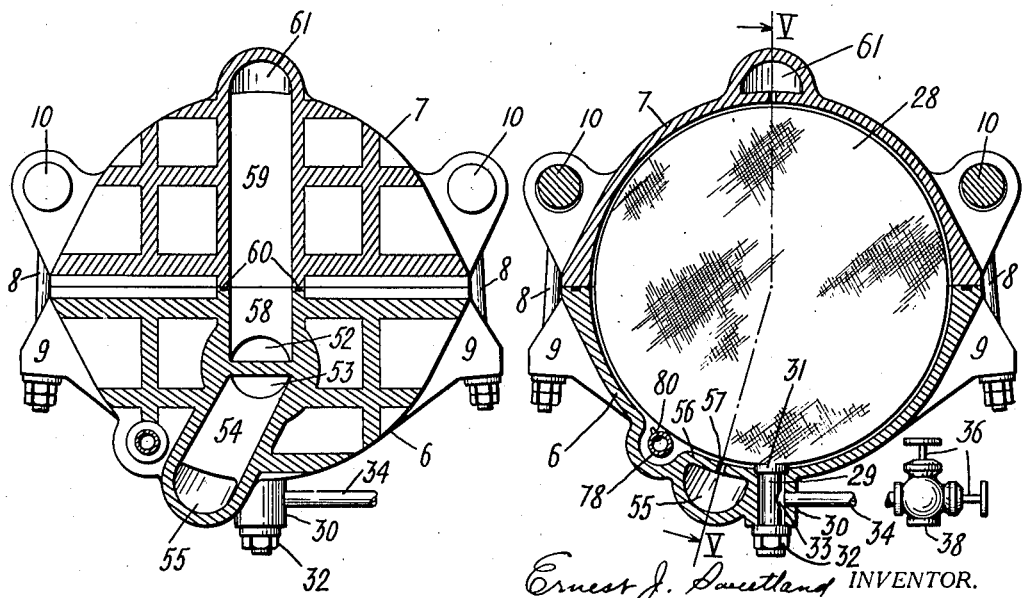

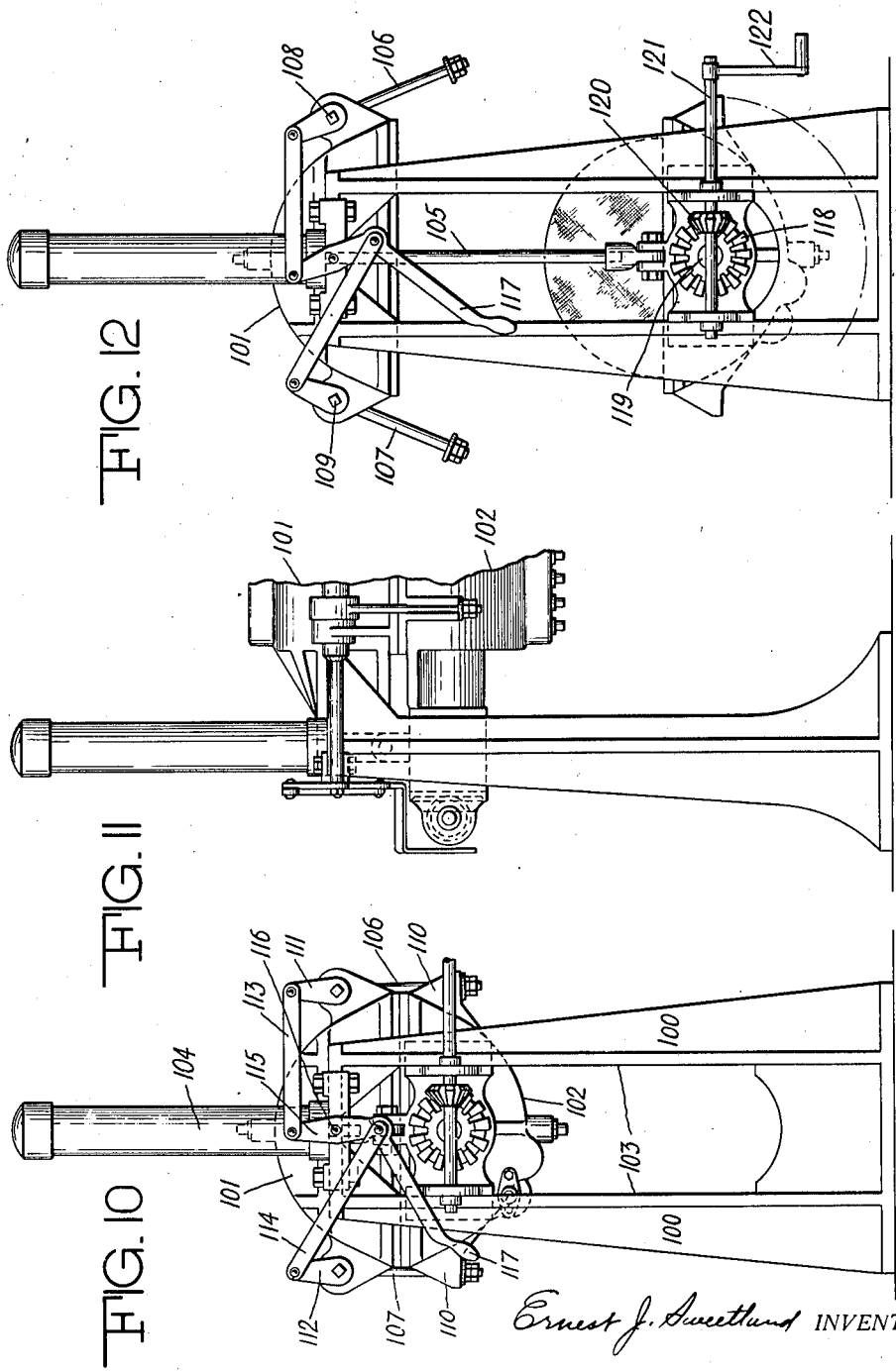

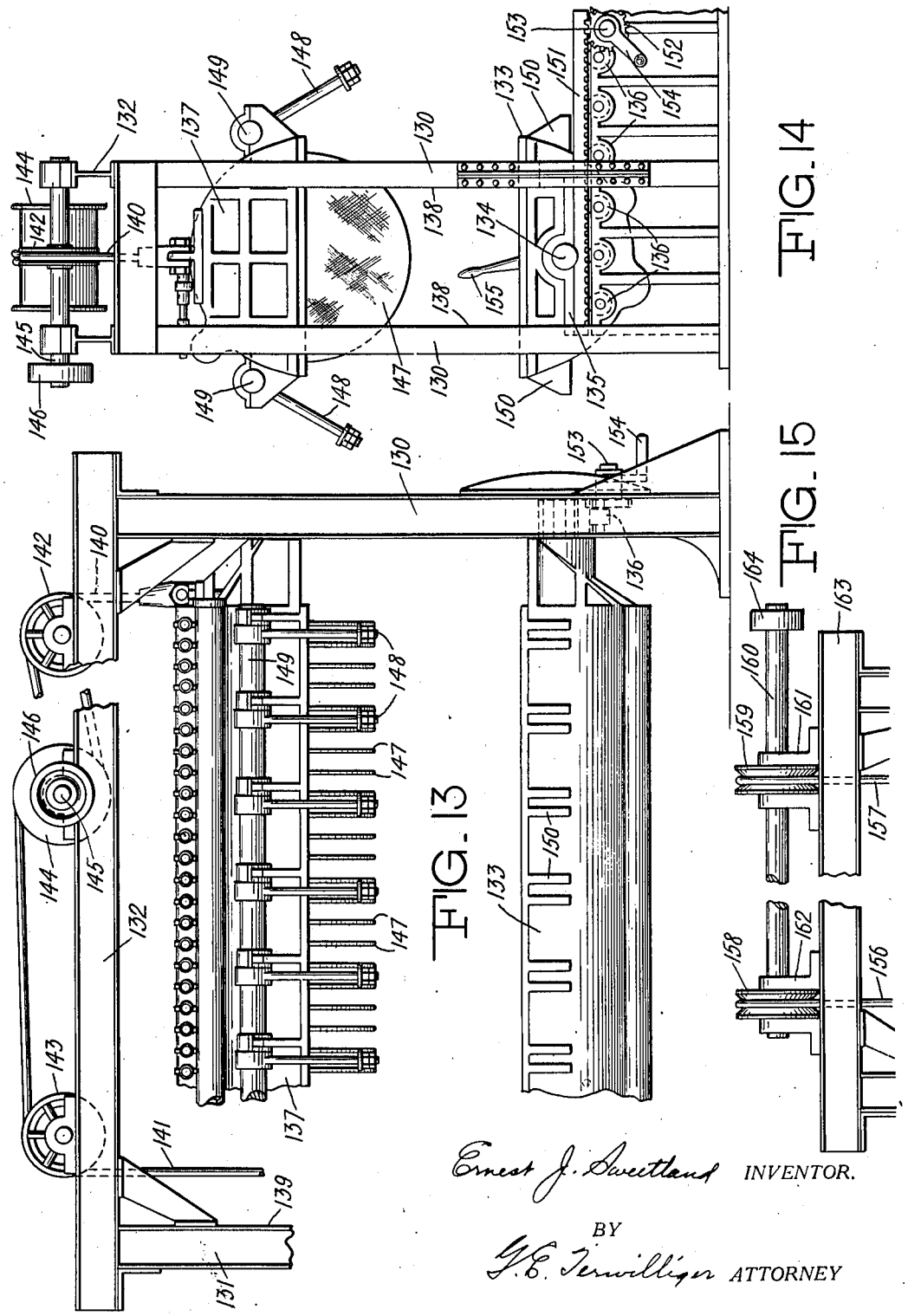

UNITED STATES PATENT OFFICE.

ERNEST J. SWEETLAND, OF MONTCLAIR, NEW JERSEY, ASSIGNOR, BY MESNE ASSIGNMENTS, TO UNITED FILTERS CORPORATION, A CORPORATION OF DELAWARE.

FILTER.

1,292,534.  Specification of Letters Patent.  Patented Jan. 28, 1919.

Application filed May 18, 1916. Serial No. 98,259.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates in general to pressure filters in which the liquid to be filtered is ordinarily introduced under pressure into a water-tight casing and then passes through a filter medium, which may take the form of a plurality of filter leaves, the clear filtrate being led into a drainage passage and so on out of the filter. Many machines of this general type have been proposed and some of them have gone into wide commercial use such, for instance, as that illustrated and described in my prior Patent No. 1,083,305. My present invention is directed more particularly to certain features of the construction of the filter casing or body, its controlling mechanism, and the filter members within the casing, so that the filter may be operated most economically and efficiently, while requiring a minimum of floor space and a minimum of attention.

In the accompanying drawings, which form a part of this specification,

Figure 1 is a side elevation of one type of filter embodying certain of my improvements.

Fig. 2 is a transverse sectional view in line II—II of Fig. 1, parts being omitted for the sake of clearness.

Fig. 3 is a longitudinal sectional view on line III—III of Fig. 2, showing in detail on an enlarged scale one of the supporting trunnions of the machine.

Fig. 4 is a transverse sectional view on line IV—IV of Fig. 1.

Fig. 5 is a longitudinal sectional view on line V—V of Fig. 4, showing the opposite trunnion from that illustrated in Fig. 3.

Fig. 6 is a transverse sectional view on line VI—VI of Fig. 5.

Fig. 7 is an end view looking toward the left-hand end of Fig. 1, a portion of the connecting piping being removed for the sake of clearness.

Fig. 8 is a view similar to Fig. 7, showing the filter in position for dumping the sludge or residue from the process of filtration and illustrating one form of mechanism for controlling the dumping of the lower filter casing.

Fig. 9 is a fragmentary detail view showing a portion of the dumping mechanism illustrated in Fig. 8.

Fig. 10 is an end view of a filter embodying a modified form of controlling mechanism.

Fig. 11 is a fragmentary side elevation of the filter of Fig. 10.

Fig. 12 shows the filter illustrated in Figs. 10 and 11 with the parts of the filter casing separated.

Fig. 13 is a side elevation showing a still further modified form of controlling mechanism.

Fig. 14 is an end view of the mechanism of Fig. 13 and

Fig. 15 is a fragmentary view showing a modified form of control for the hoisting cables.

Referring to the drawings in detail, the numeral 1 designates the front uprights or posts for supporting the filter. These posts, together with similar rear posts 2, support a skeleton platform 3. Mounted within the front posts is a support 4 corresponding to a support 5 at the rear of the filter, these two supports being designed normally to sustain the weight of the filter casing, which consists of a lower section 6 and an upper section 7. The upper section is adapted to rest upon and be supported by the lower section and when in this position, the sections may be clamped together so as to form a water-tight casing by means of a plurality of swing bolts 8 engaging lugs 9 on the lower section of the casing. The swing bolts are preferably mounted on cams carried by the shafts 10 in the manner illustrated and described in my prior Patent No. 1,083,305. The two cam shafts may be simultaneously operated to throw the swing bolts into and out of engagement with the lugs by a mechanism consisting of a pilot wheel 11 mounted on a shaft 12, which is in turn geared to a shaft 13, as is clearly shown in Figs. 1 and 7. The shaft 12 is provided with a sprocket wheel 14 over which passes the chain 15 meshing with a sprocket wheel 16 secured to the first cam shaft 10. A sprocket wheel 17 on the shaft 13 similarly meshes with a chain 18, which passes over a second sprocket wheel 19 secured to the other cam shaft 10. It will be obvious that by means of this arrangement of chains and gearing, the movement of the pilot wheel in a counter-clock-wise direction (referring to Fig. 7) will throw the swing bolts out of engagement with the lugs, whereas rotation of the pilot wheel in the opposite direction will cause the bolts to engage the lugs and clamp the filter sections together.

The left-hand end of the lower filter section 6 (referring to Fig. 1) which may for convenience be termed the front end is provided with a hollow gudgeon or trunnion 20, which is rotatably journaled in the support 4 previously referred to, and the right-hand or rear end of the lower filter section is provided with a hollow gudgeon or trunnion 21, which is rotatably journaled in the support 5. Means for rotating the lower filter section is provided in a worm wheel 22, meshing with a worm 23 on a cross shaft 24 which is operated by a crank 25.

In order to make it possible to rotate the lower filter section in its bearings, it is first necessary to lift the upper filter section 7, so as to clear the lower section. This is accomplished by suspending the upper filter section from rods or other tension members 26, which may enter steam or hydraulic cylinders 27 supported upon the skeleton platform 3. The filter section 7 is guided in its vertical travel by engagement with the two pairs of posts 1 and 2.

Within the filter casing and preferably mounted in the lower section are a plurality of filter leaves 28, shown in Figs. 4 and 5. The internal construction of these filter leaves forms no part of my present invention and they may be constructed as shown in my prior Patent No. 1,083,305. They are preferably held in place by downwardly extending nipples 29 passing through a ridge 30 forming an integral part of the bottom of the lower filter member 6. As shown in Fig. 4, each nipple 29 is received in a vertical hole in the ridge 30 of slightly larger diameter than the external diameter of the nipple. There is no communication between this series of vertical holes through the ridge 30. The upper end of the nipple is preferably provided with a circular shoulder 31 fitting within a suitable recess in the filter casting, as shown in Fig. 4, and the outer end is screw-threaded and adapted to receive a cap nut 32. When this nut is tightened home, it will be seen that the filter leaf is tightly clamped in place in the lower section of the filter although the periphery of the leaf at no point engages the inside of the filter casing. The drainage nipple is provided with an orifice 33 communicating with a drainage pipe 34 leading to the outlet manifold 35. By means of the valves 36 and 37, the filtrate passing from the nipple 29 through the outlet pipe 34 may be caused to enter the outlet manifold or to discharge through the orifice according as these valves are adjusted. This provides for either open or closed delivery of the filtrate and it also permits the attendant to shut off the flow of filtrate from any leaf at any time without disturbing the operation of the remainder of the filter.

The rear or right-hand trunnion 22 (see Fig. 5) is provided with a horizontal partition wall 39, which merges with the bottom of the pipe at 40, a point beyond the orifice 41 in the lower-half of the pipe or trunnion. This orifice when the lower filter section is in normal upright position, alines and communicates with a pipe 42, provided with a slip collar 43 surrounding the trunnion and forming a rotatable water-tight connection with it by means of stuffing boxes 44 and 45. The pipe 42 may be provided with a control valve 46. The extreme outer end 47 of the trunnion 21 is surrounded by a slip-coller 48 with which it forms a water-tight joint by means of the stuffing box 49. This slip collar connects the trunnion with a pipe 50 controlled by a valve 51. By virture of this construction, the pipe 50 is in free communication with the end of the trunnion 47 and consequently with the passage 52, no matter what the arc through which the trunnion is rotated.

Through the coöperation of the slip collar 43 with the trunnion, it will be seen that when the lower filter section is in its normal position, the pipe 42 communicates through the hole 41 with the passage 53 which, in turn, opens into a vertical passage 54 opening into the conduit 55 leading along the bottom of the lower filter section. The bottom wall 56 of this lower section is provided with passages 57 located between the filter leaves 28, to provide a means of communication between the conduit 55 and the interior of the filter chamber. Similarly the passage 52 opens into the vertical passage 58, alining with a similar passage 59 in the upper filter section, which is in effect a continuation of the passage 58, a water-tight seal between the sections when they are closed being insured by a gasket 60. The passage 59 leads to a horizontal conduit 61 passing along the top of the upper filter section. This upper conduit communicates with the interior of the filter casing through a plurality of openings 62 corresponding to the openings 57 already described.

The front or left end of the trunnion 20 (see Figs. 2 and 3) is divided into two passages 63 and 64, by the wall 65 which merges with the lower part of the trunnion wall at the point 66 just beyond an orifice 67 in that portion of the wall of the trunnion which is normally at the bottom when the lower filter section is in its usual position. This orifice alines with an annular passage 68 formed in a slip collar 69 surrounding the extending end of the trunnion. A water-tight joint between the slip collar and the trunnion is maintained by means of two stuffing boxes 70 and 71. By means of this construction it will be seen that the annular passage 68 and consequently the pipe 72 which opens into it will be in communication with the passage 64 no matter in what position the trunnion may be in its bearing.

Into the open end of the trunnion 20 is inserted a pipe 73 with which it has a rotatable water-tight connection through the provision of a stuffing box 74. This construction insures free communication between the pipe 73 and the passage 63 no matter through what arc the trunnion may be rotated.

The passage 63 opens into a pipe 75 which is in communication with the manifold 35. The passage 64 leads to a downwardly-extending passage 76 opening into a chamber 77, surrounding the end of a sluicing pipe 78 which extends through a stuffing box 79 into the interior of the filter body and which may be provided with suitable nozzles 80 (Fig. 4) for directing a stream of washing fluid, such as water, steam or compressed air, across or against the surfaces of the filter leaves.

The projecting end 81 of the sluicing pipe passes out of the filter casing through another stuffing box 82 and is provided with a handle 83 by which the pipe may be oscillated so as to cause streams of washing fluid to play across the faces of the filter leaves.

Communication between the interior of the sluicing pipe and the chamber 77 may be provided by means of the opening 84.

In Figs. 8 and 9 I have illustrated means for automatically dumping the lower filter casing section after the upper section of the casing has been elevated to a suitable height. This mechanism may replace the worm and worm-wheel 22 and 23, or it may be used in addition to the manual means for reversing. In the form shown in Figs. 8 and 9 the front trunnion may be provided with an extending stub shaft 84 on which is keyed a gear 85 meshing with a gear 86 on a shaft 87. The latter shaft also has mounted upon it a sprocket wheel 88, over which runs a chain 89 which passes over a second sprocket 90 mounted on a horizontal shaft 91 carried in bearings 92 and 93 secured to the posts 1. Upon the shaft 91 is mounted a pair of arms 94 having incurved upper extremities adapted to engage the inclined flange 95 of the upper section of the filter body or casing as it is slowly raised by the action of the hydraulic cylinders 27. Engagement of this flange with the fingers 94 lifts them from the dotted position into the full line position of Fig. 9, thus turning the shaft 91 and the sprocket 90, which in turn rotates the sprocket 88 through the agency of the chain 89, and causes the gear 86 to rotate the gear 85 and thus invert the lower section of the filter casing moving it into substantially the position shown in Fig. 8, and thus dumping any sludge or residue from filtration which it may contain. When the upper section of the filter casing is lowered again, the horizontal bottom of the flange 95 will engage a second set of fingers 96 and will return them and the shaft 91 to their original position and, through the chains and sprockets, the lower section of the filter casing will be turned back into its normal upright position.

In Figs. 10, 11 and 12 I have shown a modification of the structure already described in which the upper section of the filter casing is designed to be normally stationary, while the lower section is movable vertically and is rotatable in order to dump its contents. In this type the filter is supported upon posts 100, upon which is rigidly mounted the upper section of the filter casing 101, while the lower section 102 of the filter casing is movable in the guides 103 provided by the posts. The position of the lower section of the filter casing is controlled by means of hydraulic cylinders 104 from which the lower section of the filter is hung by any suitable suspension means such as rods 105. When the filter is closed, that is, when the lower section of the casing is raised to its highest position in the guides 103, the two filter sections may be clamped together by means of swing bolts, 106 and 107, mounted upon the eccentric shafts 108 and 109, respectively. The lower ends of the swing bolts engage lugs 110 preferably integral with the lower section of the filter casing. The construction of the swing bolts, lugs and cam shafts which operate the bolts, may be identical with that already referred to in the type of filter first described. In order to operate the two cam shafts simultaneously, I may connect them by means of arms 113 and 114 to a swinging lever 115, which is pivoted at 116 to a fixed part of the upper section of the filter casing. The lever 115 is preferably provided with a handle 117 by which it may be operated. It will be seen that when this handle is thrown to the right it will rotate the two cam shafts through a small arc in opposite directions, thus releasing the swing bolts and throwing them out of engagement with the lugs 110 and into the position shown in Fig. 12. After the swing bolts have been thrown into this position, the lower member of the filter casing may be lowered into substantially the position shown in Fig. 12 by operating the hydraulic cylinders 104. When in this position the lower section of the filter may be rotated by any suitable means, such as the bevel gear 118 keyed to a shaft 119 forming an extension of the front trunnion of the machine. This gear meshes with a second bevel gear 120 mounted upon a cross-shaft 121 which may be provided with a handle 122.

For the sake of clearness much of the valve mechanism has been omitted from Figs. 10, 11 and 12, but it will be appreciated that this mechanism may be substantially similar to that already described in connection with Figs. 1 to 8 inclusive.

Figs. 13, 14 and 15 illustrate a further modification in which the filter leaves, instead of being supported in the bottom section of the filter casing, are suspended from the upper section of the filter casing. Referring specifically to these figures, numeral 130 designates the front posts, and the numeral 131 the rear posts of a frame-work which carries at its top a skeleton platform 132. The lower section 133 of the filter casing is rotatably mounted upon trunnions 134 journaled in a carriage 135 at each end of the machine. The carriage, in turn, is supported upon a plurality of rollers 136. The upper section 137 of the filter casing is adapted to reciprocate in guide-ways 138 and 139 formed by the posts 130 and 131. This section of the casing may be suspended from cables 140 and 141, passing over sheaves 142 and 143, respectively, and wound in opposite directions upon a drum 144 mounted upon a shaft 145, to which power may be applied in any suitable manner, as by means of the pulley 146. It will be seen that when this pulley is rotated in a clockwise direction with respect to Fig. 13, the cables will be wound upon the drum and the upper section of the filter casing will be raised, whereas if the pulley is rotated in the opposite direction the upper section will be lowered.

In the upper section of the filter are mounted a plurality of filter leaves 147. Their construction, and the method of mounting them in the filter casing, may be similar to that illustrated and described in my prior United States Patent No. 1,083,305, and the means for clamping the two sections of the filter together, including the swing bolts, 148, cam shafts 149 and lugs 150 may also be the same as that shown and described in that patent.

After the swing bolts have been thrown out of engagement with the lugs and the upper casing section has been lifted into the position shown in Fig. 14, the lower section of the filter casing may be moved to the right by any suitable means, such as the rack 151 which is secured at one end to the carriage 135 and which engages a gear 152 mounted upon a shaft 153, to which is attached a handle 154. It will be seen that after the lower section of the filter casing has been moved to the right completely from under the upper section of the casing, any cake or deposit which remains clinging to the filter leaves may be dislodged in any one of the well-known ways, and will then fall directly into any suitable receptacle located beneath the filter. At the same time any sludge or solid matter remaining in the lower section of the filter may be dumped by rotating the lower section of the filter about its axis by means of the handle 155.

In Fig. 15 I have shown a form of suspending mechanism which is adapted for any of the types of filters already described. This consists of cables 156 and 157 passing over sheaves 158 and 159, respectively, which are carried by a shaft 160 mounted in bearings 161 and 162 supported by the upper platform 163 of the filter structure. The rotation of the shaft 160 by any suitable means, such as power applied to a pulley 164, will raise or lower the cables 156 and 157 as desired.

In the filtration of ordinary materials the mixture to be filtered may be introduced through the trunnion at one end of the filter and may be fed either through the channel along the bottom of the filter, or through the channel 61 at the top, both of which have apertures leading into the filter-body between the filter elements. Some materials may be treated to advantage by feeding through the bottom channel, and others work better when fed through the upper channel, and one of the objects of my invention is to provide a construction by which the material may be fed through either top or bottom with equal convenience. In handling certain classes of material, it is desirable to have a circulation of the liquid through the filter-body during filtration with the object of keeping the solid matter in suspension. This may be accomplished by feeding through the lower channel, and, at the same time, withdrawing a portion of the liquid through the upper channel, and through the pipe 50 communicating with it. This gives an uprising current between all of the filter elements, which tends to keep in suspension particles that otherwise would settle to the bottom and thus escape being deposited upon the filter leaves. In certain cases where the material settles very rapidly, the liquid to be filtered may be fed through the upper channel and a small stream constantly withdrawn through the lower channel and pipe 42. By so doing, the solid matter, which would otherwise remain in the bottom of the filter is withdrawn, leaving the cakes on the filter leaves 28 of uniform thickness at the top and bottom of the filter body. It will be observed that the feed channels 55 and 61 at the top and bottom of the filter constitute a convenient and effective means of evenly distributing the sludge, or liquid material to be filtered. This is an improvement over methods heretofore practised of introducing all the sludge into the filter body through a single opening.

One of the great advantages of the filter construction herein described is that the filter-body is simple in form and does not contain any irregular pockets or dead spaces where the solid matter may settle out of the liquid during filtration. Such dead spaces are also detrimental to efficient washing, since they retain a large quantity of solution which must either be drained from the filter-body, or displaced by dilution before the cakes can be completely washed.

In the ordinary operation of this filter the filter cakes are deposited upon the leaves to such a thickness that a small space remains between adjacent cakes to form a path for the wash water, but for certain classes of work I prefer to fill the spaces between the leaves solidly full of cake and remove the cake by means of the sluicing jets from the nozzles 80 (Fig. 4) after the filter has been opened.

The ordinary method of operating the filter of the design shown in Figs. 1 to 6 is as follows:—The liquid to be filtered is introduced through one of the channels 61 and 55 until a layer of solid matter of convenient thickness, say 1 inch, has been deposited upon the surfaces of the filter leaves 28. As soon as this has been accomplished, the supply of liquid to be filtered is shut off and the supply of wash water is turned on through the same channel and continued under pressure until the soluble salts are removed from the cakes. When this has been finished, as indicated by the tests of the "effluent filtrate", the surplus moisture lying between the cakes is blown out with compressed air, which may be admitted through any convenient opening into the filter chamber. I prefer to admit the compressed air through the upper feed channel 61 and in case the cakes are quite porous, the remaining liquid between the cakes may be blown out through the filter leaves, passing through the channels ordinarily followed by the filtrate, but if the cakes are of a slimy character, this would involve considerable delay, and in such case I prefer to blow the excess liquid through the lower feed channel 55 through any convenient pipe connection.

In cases where it is desirable to discharge the cake in as dry and compact a form as possible, this is done in the following manner: The upper member 7 of the filter-body is lifted off, and the lower member 6 is inverted. Compressed air or steam is admitted to the interior of the filter leaves through the filtrate channel 35. This reversal of current disengages the cake from the filter surface, causing it to fall into any convenient receptacle underneath. Where the cake adhering to the filter surfaces is very slimy or sticky. I prefer to invert the lower half 6 of the filter-body and then turn water under high pressure through the sluicing pipe 78, while the same is rocked backward and forward by means of the handle 83 causing streams between all of the filter leaves to sweep across the filter surfaces and thus remove the adhering solids. During this sluicing operation, it is advisable to admit compressed air or steam intermittently into the interior of the filter elements, since the combination of reverse current through the leaves with the sluicing streams, is found to be more effective than either one alone.

One particular advantage of this construction is the fact that the filtrate drains out of the filter leaves downwardly, so that the cakes may be dried much more effectively than is the case with a filter which discharges the filtrate from the top of the filter leaves. In filters wherein filtrate is discharged from the top of the filter elements, these elements must be constructed in such a manner as to make the space between the filter cloths on each leaf as narrow as possible, as otherwise a considerable volume of liquid would be included in each leaf at the end of the filtering operation. This is objectionable for two reasons: First, it is desired in most cases to recover the liquid, and, second, in case the pressure against the filter cake should accidentally be released, the hydrostatic pressure of the liquid within the leaves tends to cause portions of the cake to fall off and thus interfere with efficient washing of the cakes, whereas in the leaf which drains downwardly there is no liquid to fall back and form a reverse pressure against the cakes under any circumstance, and for this reason a filter of the downward drainage type is more positive and simple to operate.

In the filtration of fullers' earth from oils it is customary to steam the cakes of fullers' earth to remove as much of the oil as possible after filtration has been completed. For this class of work it is especially desirable to have the liquid drain downwardly, because it is difficult to force the oil out from the interior of the filter leaves against gravity by means of steam or compressed air, whereas I have found it possible to remove the oil from the cake much more effectively when downward drainage was used. The peculiar construction of this filter permits the leaf to drain downwardly during filtration, but when in position for cleaning, that is, in the position shown in Fig. 8, the outlet of the filter leaf is facing upwardly. This is an advantage because in some cases it is desirable to introduce water into the interior of the filter leaves during cleaning in order to open up the pores of the cloth, and to do this effectively the leaf should have the inlet at the top during this operation.

Another especial advantage of this construction is that the portion of the filter-body which carries the filter leaves may be turned into any desired position, so that it is particularly convenient to insert or remove the filter leaves. An especially convenient position for changing the filter leaves is to have the lower member turned sidewise through about 90 degrees, so that the operator may insert or remove leaves very much as books may be inserted or removed from a book case. Since metallic filter cloth described in my Patent No. 1,147,279 has proven to be of great advantage in certain classes of filtration, it becomes necessary to make filter leaves of heavier construction than was hitherto required. The construction of this filter with its particular convenience in changing the filter leaves, removes to a great extent the disadvantage of heavy filter leaves.

The relatively small floor space occupied by this filter is particularly desirable, and another advantage of importance is the simplicity of piping, there being no flexible connections whatsoever, and no pipes to be disconnected when the filter is turned up in position for discharging the filter cakes. A further advantage is the accessibility of the internal parts of the filter and the extreme ease with which they may be inspected. This filter may be operated with either open or closed delivery of the filtrate, as may be desired.

When the filter is inverted for dumping as shown in Fig. 8, the cake cannot fall into the shell, but has a clear space in which to fall into the receptacle underneath. On the other hand the sluicing pipe, by means of the special arrangement shown in detail in Fig. 3, may be operated when the filter body is in any position.

While I have illustrated and described only certain specific embodiments of my invention, I realize that it is susceptible of broad application, and I do not desire to be limited to the precise construction shown and described.

Having thus described my invention, what I claim and desire to secure by Letters Patent, is:

1. In a filter, a casing comprising two separable parts, means for rotatably supporting one of said parts and means for introducing liquid into the casing through said supporting means.

2. In a filter, a casing comprising two separable parts, means for rotatably supporting one of said parts and means for introducing liquid into the casing through said supporting means irrespective of the position of the member so supported.

3. In a filter, a casing comprising two separable parts, means for rotatably supporting one of said parts and means for introducing liquid into the casing through said supporting means, including a plurality of independent passages into the interior of the filter.

4. In a filter, a casing comprising two separable parts, one resting upon the other, means for rotatably supporting one of said parts and means for introducing liquid into the casing through said supporting means irrespective of the position of the member so supported.

5. In a filter, a casing comprising two separable parts, one resting upon the other, means for rotatably supporting one of said parts at its ends, and means for introducing liquid into the casing through said supporting means.

6. In a filter, a casing comprising two separable parts, one resting upon the other, means for rotatably supporting one of said parts at its ends, and means for introducing liquid into the casing through said supporting means irrespective of the position of the member so supported.

7. In a filter, a casing comprising two separable parts, means at each end of one of said parts for rotatably supporting it and means for introducing liquid into the casing, including a conduit through said supporting means.

8. In a filter, a casing comprising two separable parts, means at each end of one of said parts for rotatably supporting it and means for introducing liquid into the casing, including a plurality of independent passages through said supporting means.

9. In a filter, a casing comprising two separable parts, means at each end of one of said parts for rotatably supporting it, and means, including a plurality of independent passages, through each of said supports for affording a connection with the inside of the casing.

10. In a filter, a casing comprising two parts separable along a substantially horizontal plane, means for rotatably supporting one of said parts and means for introducing liquid into the casing through said supporting means.

11. In a filter, a casing comprising two parts separable along a substantially horizontal plane, means for rotatably supporting one of said parts and means for introducing liquid into the casing through said supporting means irrespective of the position of the member so supported.

12. In a filter, a casing comprising two parts separable along a substantially horizontal plane, means for rotatably supporting one of said parts and means for introducing liquid into the casing through said supporting means, including a plurality of independent passages into the interior of the filter.

13. In a filter, a casing comprising two parts separable along a substantially horizontal plane, means for rotatably supporting one of said parts and means for introducing liquid into the casing through said supporting means irrespective of the position of the member so supported.

14. In a filter, a casing comprising two parts separable along a substantially horizontal plane, means for rotatably supporting one of said parts at its ends, and means for introducing liquid into the casing through said supporting means.

15. In a filter, a casing comprising two parts separable along a substantially horizontal plane, means for rotatably supporting one of said parts at its ends, and means for introducing liquid into the casing through said supporting means irrespective of the position of the member so supported.

16. In a filter, a casing comprising two parts separable along a substantially horizontal plane, means at each end of one of said parts for rotatably supporting it and means for introducing liquid into the casing, including a conduit through said supporting means.

17. In a filter, a casing comprising two parts separable along a substantially horizontal plane, means at each end of one of said parts for rotatably supporting it and means for introducing liquid into the casing, including a plurality of independent passages through said supporting means.

18. In a filter, a casing comprising two parts separable along a substantially horizontal plane, means at each end of one of said parts for rotatably supporting it, and means including a plurality of independent passages through each of said supports for affording a connection with the inside of the casing.

19. In a filter, a plurality of spaced filter members, a casing for completely inclosing said members comprising two parts separable along a substantially horizontal plane, means for detachably clamping the parts in fixed operative position, means for separating said parts an appreciable distance from each other in a rectilinear direction, said casing being provided with a conduit leading from the filter members to the exterior of the casing.

20. In a filter, a plurality of spaced filter members, a casing for completely inclosing said members comprising two parts separable along a substantially horizontal plane, means for rotatably supporting one of said parts and means for causing said parts to separate in a vertical direction and means for inverting the rotatable part after separation, said casing being provided with a conduit leading from the filter members to the exterior of the casing.

21. In a filter, a plurality of spaced filter members, a casing for completely inclosing said members comprising two parts separable along a substantially horizontal plane, means for rotatably supporting the lower part, means for causing the vertical separation of the two parts, and means for rotating the lower part after separation, said casing being provided with a conduit leading from the filter members to the exterior of the casing.

22. In a filter, a plurality of spaced filter members, a casing for completely inclosing said members comprising two parts separable along a substantially horizontal plane, means for detachably clamping said parts in fixed operative position, means for causing the vertical separation of said parts and means for inverting the lower part after separation, said casing being provided with a conduit leading from the filter members to the exterior of the casing.

23. In a filter, a casing comprising two parts separable along a substantially horizontal plane, trunnions at each end of one of said parts, bearings rotatably supporting said trunnions, and a plural passage through one of said trunnions.

24. In a filter, a casing comprising two parts separable along a substantially horizontal plane, trunnions at each end of one of said parts, bearings rotatably supporting said trunnions, and a plural passage through each of said trunnions.

25. In a filter, a casing comprising two parts separable along a substantially horizontal plane, a trunnion at each end of one of said parts, bearings rotatably supporting said trunnions, a conduit longitudinally arranged along the wall of one of said parts and having spaced passages leading into the interior of the casing and connecting with one of said trunnions.

26. In a filter, a casing comprising two parts separable along a substantially horizontal plane, a trunnion at each end of one of said parts, bearings rotatably supporting said trunnions, a conduit longitudinally arranged along the wall of each of said parts, and provided with spaced openings into said casing, each of said conduits connecting with the exterior of the casing through separate passages in a trunnion.

27. In a filter, a casing comprising two parts separable along a substantially horizontal plane, a trunnion at each end of one of said parts, bearings rotatably supporting said trunnions, a conduit longitudinally arranged along the wall of each of said parts, and provided with spaced openings into said casing, each of said conduits connecting with the exterior of the casing through separate passages in the same trunnion.

28. In a filter, a casing comprising two parts separable along a substantially horizontal plane, a plurality of vertical filter leaves mounted in the lower section, a longitudinal conduit passing along said section, and communicating with said leaves, means for rotatably supporting said lower section, said means having a passage therethrough communicating with said conduit.

29. In a filter, a casing comprising two parts separable along a substantially horizontal plane, a plurality of vertical filter leaves mounted in the lower section, means for causing the vertical separation of said sections, and means for rotating the lower section after separation.

30. In a filter, a casing comprising two parts separable along a substantially horizontal plane, means for causing the vertical separation of said parts, a plurality of filter leaves vertically mounted in the lower section, a conduit passing longitudinally along the bottom of the lower section and communicating with said leaves, means for rotatably supporting the lower section and means for introducing liquid into the conduit through said supporting means.

31. In a filter, a casing comprising two parts separable along a substantially horizontal plane, means for rotatably supporting one of said parts at its ends, means for introducing into and withdrawing liquid from the casing through the supporting means at one end of the casing, and means for rotating one of the parts of the casing.

32. In a filter, a casing comprising two parts separable along a substantially horizontal plane, a supporting trunnion at each end of one of said parts, bearings rotatably supporting said trunnions, a plurality of filter members within the casing, a discharge conduit communicating with the interior of said casing only through said members, a passage through one of said trunnions communicating with said conduit and a separate passage through one of said trunnions communicating directly with the interior of the filter casing.

33. In a filter, a casing comprising two parts separable along a substantially horizontal plane, a supporting trunnion at each end of one of said parts, bearings rotatably supporting said trunnions, a plurality of filter members within the casing, a discharge conduit communicating with the interior of said casing only through said members, a passage through one of said trunnions communicating with said conduit and a separate passage through one of said trunnions communicating directly with the interior of the filter casing at spaced points along the length thereof.

34. In a filter, a casing comprising two parts separable along a substantially horizontal plane, trunnions for rotatably supporting one of said parts, a plurality of filter members within said casing, a conduit communicating with the interior of said casing only through said members, a passage through one of the trunnions communicating with said conduit and a passage through the other trunnion communicating directly with the interior of the filter casing.

35. In a filter, a casing comprising two parts separable along a substantially horizontal plane, trunnions for rotatably supporting one of said parts, a plurality of filter members within said casing, a conduit communicating with the interior of said casing only through said members, a passage through one of the trunnions communicating with said conduit and a passage through the other trunnion communicating directly with the interior of the filter casing at spaced points along the length thereof.

36. In a filter, a casing comprising two parts separable along a substantially horizontal plane, trunnions for rotatably supporting one of said parts, filter members within said casing, a conduit communicating with the drainage area of said filter members, a passage through one of the trunnions communicating with said conduit and a plurality of separate passages through a trunnion independently communicating with the interior of the filter casing.

37. In a filter, a casing comprising two parts separable along a substantially horizontal plane, trunnions for rotatably supporting one of said parts, filter members within said casing, a conduit communicating with the drainage area of said filter members, a passage through one of the trunnions communicating with said conduit and a plurality of separate passages through another trunnion independently communicating with the interior of the filter casing.

38. In a filter, a casing comprising two separable parts, trunnions for rotatably supporting one of said parts, filter members within said casing, a passage communicating with the interior of said filter members, a passage through one of the trunnions communicating with said first-named passage, means for introducing liquid into the filter through the other trunnion and means for independently introducing wash-water into the casing through a trunnion.

39. In a filter, a casing comprising two separable parts, trunnions for supporting one of said parts, filter members within the casing, a passage communicating with the interior of said filter members, a passage through one of the trunnions communicating with the said first-named passage, a plurality of independent passages through the other trunnion communicating with the interior of the casing and a passage through one of the trunnions for introducing wash-water into the interior of the casing.

40. In a filter, a casing comprising two separable parts, trunnions for supporting one of said parts, filter members within the casing, a passage communicating with the interior of said filter members, a passage through one of the trunnions communicating with the said first-named passage, a plurality of independent passages through the other trunnion communicating with the interior of the casing, a passage through one of the trunnions for introducing washwater into the interior of the casing and a slip collar associated with each trunnion for affording communication with one of the passages therein, irrespective of the position of the trunnion.

41. In a filter, a casing comprising two separable parts, a plurality of vertical filter leaves, each provided with a rigid extension projecting downwardly therefrom and constituting a conduit communicating with the interior of the leaf, a corresponding plurality of seats in the bottom of said lower section adapted to receive said projections and means for clamping said projections against said seats to maintain said filter leaves in place in the lower filter section.

42. In a filter, a casing comprising two separable parts, a plurality of vertical filter leaves, each provided with a rigid extension projecting downwardly therefrom and constituting a conduit communicating with the interior of the leaf, a corresponding plurality of seats in the bottom of said lower section adapted to receive said projections, means for clamping said projections against said seats to maintain said filter leaves in place in the lower filter sections and means for oscillating said lower section.

43. In a filter, a casing comprising two separable parts, a plurality of vertical filter leaves, each provided with a rigid extension projecting downwardly therefrom and constituting a conduit communicating with the interior of the leaf, a corresponding plurality of seats in the bottom of said lower section adapted to receive said projections, means for clamping said projections against said seats to maintain said filter leaves in place in the lower filter section and means for oscillating said lower section about an axis perpendicular to the surface of said leaves.

44. In a filter, a casing comprising two parts, separable along a substantially horizontal plane, a supporting trunnion at each end of one of said parts, bearings rotatably supporting said trunnions, a plurality of filter members within the casing, means affording communication between the interior of said members and the exterior of the casing and a passage through one of said trunnions communicating with the interior of the filter casing.

45. In a filter, a casing comprising two parts, separable along a substantially horizontal plane, a supporting trunnion at each end of one of said parts, bearings rotatably supporting said trunnions, a plurality of filter members within the casing, means affording communication between the interior of said members and the exterior of the casing and a passage through one of said trunnions communicating with the interior of the filter casing, at spaced points along the length thereof.

46. In a filter, a casing comprising two parts separable along a substantially horizontal plane, a trunnion at each end of one of said parts, bearings rotatably supporting said trunnions, a conduit longitudinally arranged along the wall of each of said parts, and provided with spaced openings into said casing at substantially opposite sides thereof, each of said conduits connecting with the exterior of the casing through separate passages in a trunnion.

47. In a filter, a casing comprising two parts separable along a substantially horizontal plane, a trunnion at each end of one of said parts, bearings rotatably supporting said trunnions, a conduit longitudinally arranged along the wall of each of said parts, and provided with spaced openings into said casing, at substantially opposite sides thereof, each of said conduits connecting with the exterior of the casing through separate passages in the same trunnion.

48. In a filter, a casing comprising two parts separable along a substantially horizontal plane, a conduit longitudinally arranged along the bottom of one of said parts, and a second conduit longitudinally arranged along the top of the other part, each of said conduits being provided with spaced openings into the casing.

49. In a filter, a casing comprising two parts separable along a substantially horizontal plane, means for rotatably supporting one of said parts, a conduit longitudinally arranged along the bottom of the lower section, a second conduit longitudinally arranged along the top of the other section, each of said conduits being provided with spaced openings into said casing and connecting with the exterior of the casing through said supporting means.

50. In a filter, a casing comprising two parts separable along a substantially horizontal plane, a trunnion at each end of one of said parts, bearings rotatably supporting said trunnions, a conduit arranged longitudinally along the top of the upper part, a second conduit arranged longitudinally along the bottom of the lower part, each of said conduits being provided with spaced openings into said casing, said conduits connecting with the exterior of the casing through separate passages in a trunnion.

51. In a filter, a casing comprising two parts separable along a substantially horizontal plane, a plurality of vertical filter leaves mounted in the lower section, means for causing the vertical separation of said sections, and means for simultaneously rotating the lower section.

52. In a filter, a plurality of spaced filter members, a casing for completely inclosing said members comprising two separable parts, means for causing the vertical separation of said parts, and means for simultaneously rotating the lower section of the lower part, said casing being provided with a conduit leading from the filter members to the exterior of the casing.

53. In a filter, a casing comprising two separable parts, trunnions for rotatably supporting one of said parts, filter members within said casing, a passage communicating with the interior of said filter members, a passage through one of the trunnions communicating with said first-named passage, a passage for introducing liquid into the filter through a trunnion, a sluicing pipe rotatably mounted in one of said parts and means for independently introducing wash-water into said sluicing pipe through a trunnion.

54. In a filter, a casing comprising two separable parts, trunnions for rotatably supporting one of said parts, filter members within said casing, a passage communicating with the interior of said filter members, a passage through one of the trunnions communicating with said first-named passage, a passage for introducing liquid into the filter through a trunnion, a sluicing pipe rotatably mounted in one of said parts and means for independently introducing wash-water into said sluicing pipe through a trunnion irrespective of the position of the part in which said sluicing pipe is mounted.

E. J. SWEETLAND.